D. L. HICKS.
DEMOUNTABLE AND INTERCHANGEABLE WHEEL FOR MOTOR CYCLES.
APPLICATION FILED FEB. 19, 1918.
1,269,437.
Patented June 11, 1918.
3 SHEETS—SHEET 3.
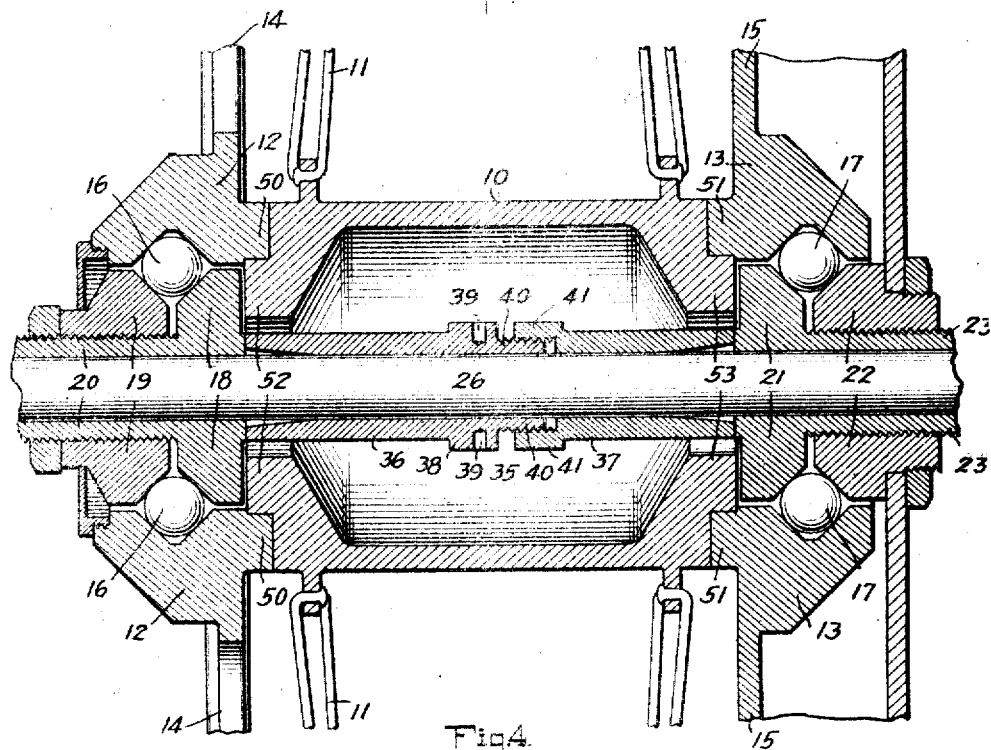
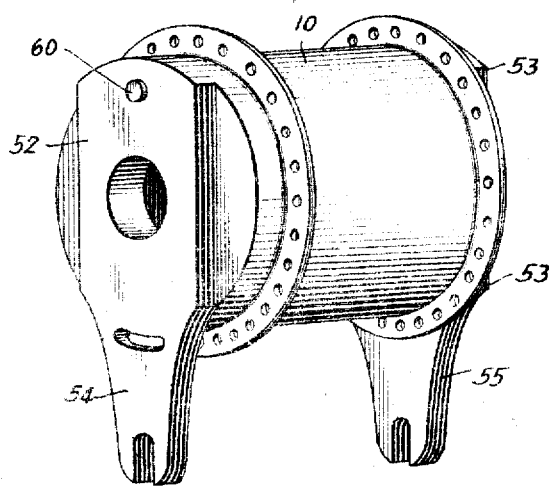
WITNESSES
Frederick Diehl.
Geo. J. Hoster
INVENTOR
D. L. Hicks.
BY Mundle.
ATTORNEYS

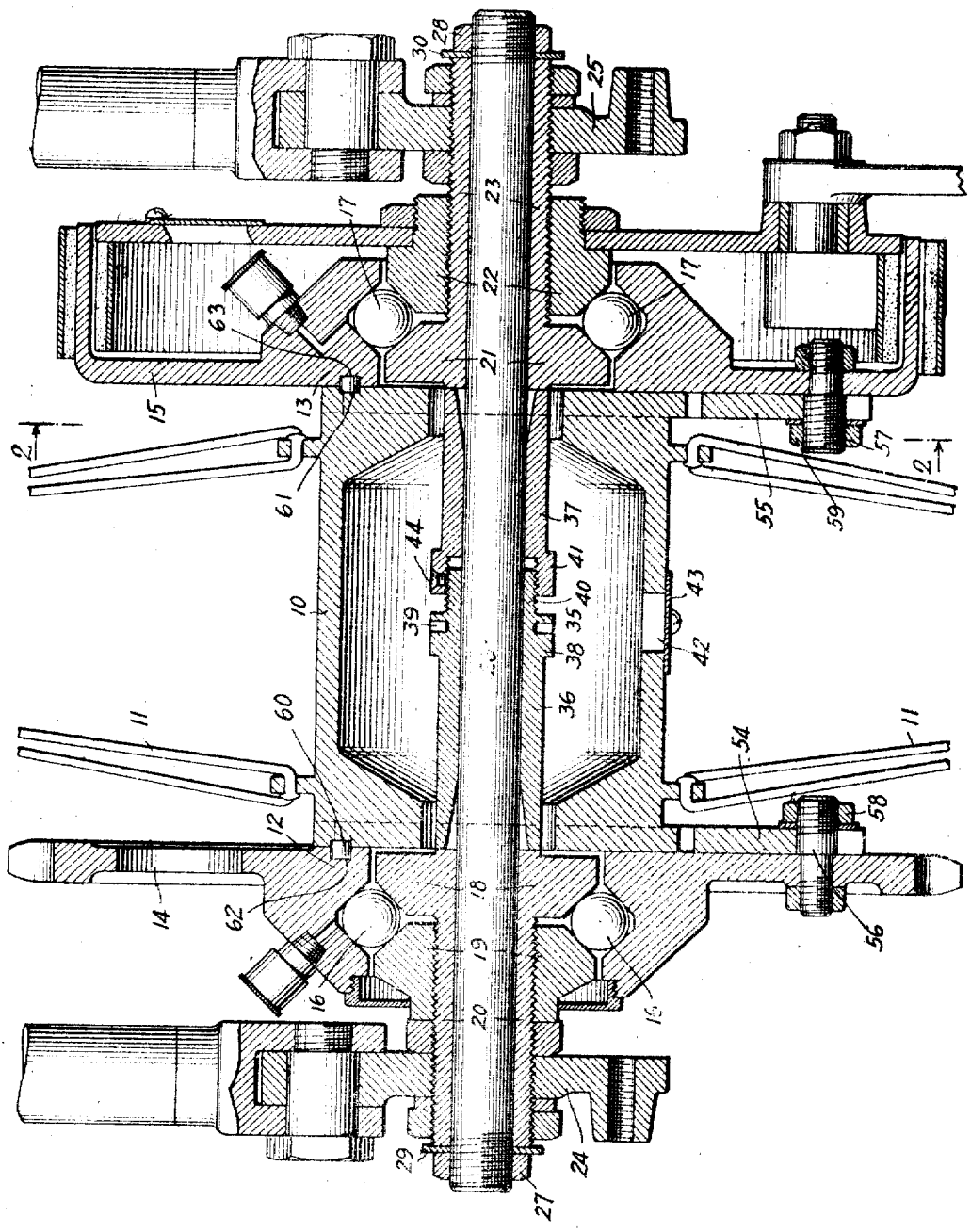

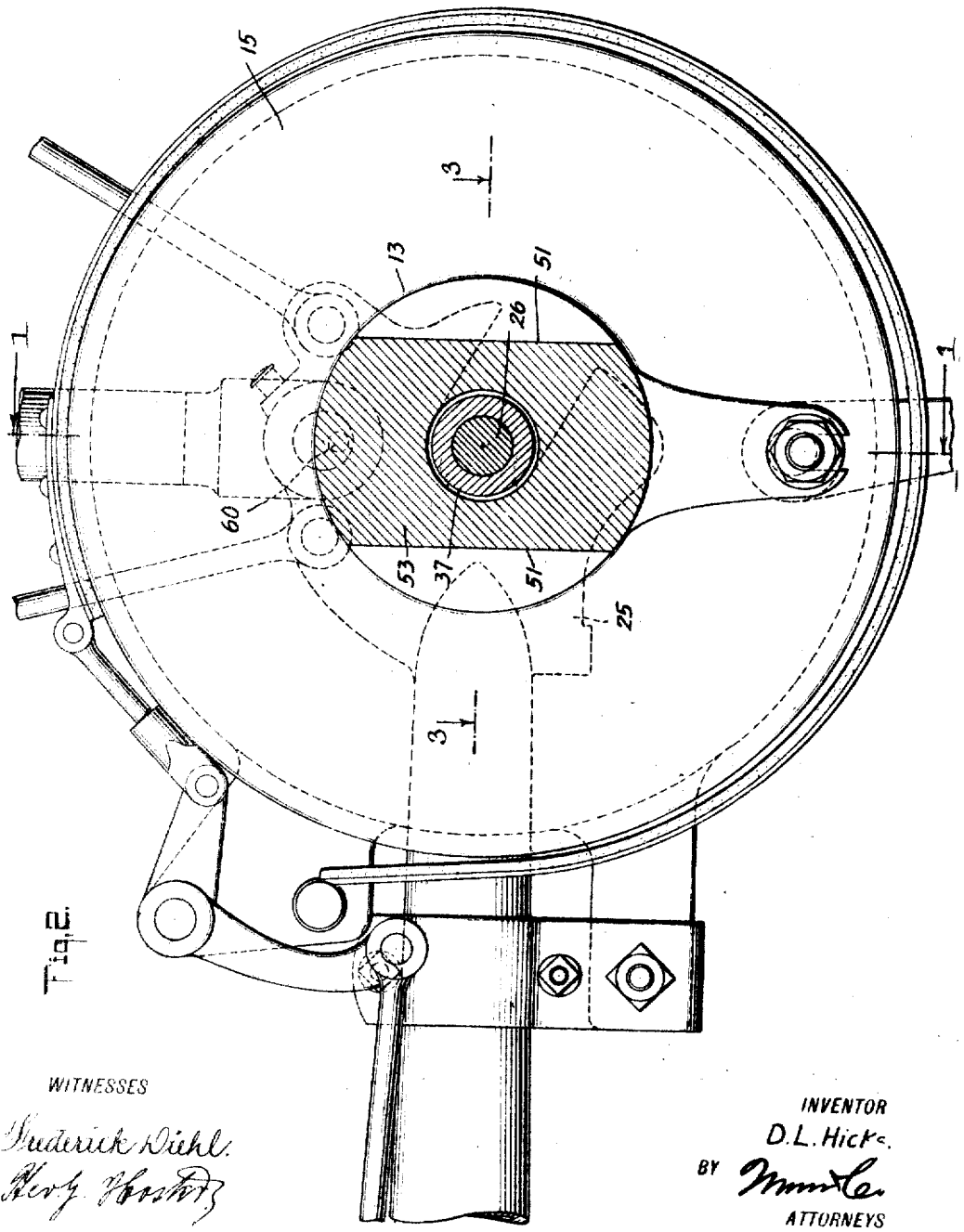

UNITED STATES PATENT OFFICE.

DANIEL LAWRENCE HICKS, OF HICKSVILLE, NEW YORK.

DEMOUNTABLE AND INTERCHANGEABLE WHEEL FOR MOTOR-CYCLES.

1,269,437.

Specification of Letters Patent. Patented June 11, 1918.

Application filed February 19, 1918. Serial No. 218,166.

*To all whom it may concern:*

Be it known that I, DANIEL LAWRENCE HICKS, a citizen of the United States, and a resident of Hicksville, in the county of Nassau and State of New York, have invented a new and Improved Demountable and Interchangeable Wheel for Motor-Cycles, of which the following is a full, clear, and exact description.

The object of the invention is to provide a new and improved demountable and interchangeable wheel for motor cycles, arranged to permit convenient and quick removal of the rear traction wheel for repairs or other purposes without disturbing the driving means or the brake mechanism. Another object is to permit of interchanging the rear traction wheel of the motor cycle for the front or steering wheel whenever it is desired to do so.

In order to accomplish the desired result, use is made of means for detachably connecting one end of the hub of the rear traction wheel with the driving gear, and means for detachably connecting the other end of the said wheel hub with the brake drum.

A practical embodiment of the invention is represented in the accompanying drawings forming a part of this specification, in which similar characters of reference indicate corresponding parts in all the views.

Figure 1 is a cross section of the demountable and interchangeable wheel in position on the motor cycle, the section being on the line 1—1 of Fig. 2;

Fig. 2 is a sectional side elevation of the same on the line 2—2 of Fig. 1;

Fig. 3 is a sectional plan view of the same on the line 3—3 of Fig. 2; and

Fig. 4 is a perspective view of the hub of the rear traction wheel.

In motor cycles, as heretofore constructed, it involved considerable time and labor to remove the rear traction wheel especially when *en route*, and in case the tire or other part of the wheel became defective and removal of the wheel for effecting proper repairs became necessary. With my improvements presently described in detail, the rear traction wheel can be quickly and conveniently removed for repairing and other purposes without disturbing the other parts of the motor cycle especially the driving wheel and the brake drum, and, if necessary, such rear traction wheel can be interchanged with the front or steering wheel if deemed desirable.

For the purposes mentioned, the hub 10 of the rear traction wheel 11 is detachably secured to the inner faces of the hubs 12 and 13 of the sprocket wheel 14 and the drum 15 of the usual brake mechanism. The hubs 12 and 13 of the sprocket wheel 14 and the brake drum 15 are mounted to rotate on ball bearings 16 and 17, of which the balls of the ball bearing 16 are mounted on the cone-shaped members 18 and 19 of the bearing, the member 18 having a hub 20 on which screws the member 19. The balls of the ball bearing 17 are mounted to travel on cone-shaped bearing members 21 and 22, of which the latter screws on the hub 23 of the member 21. The hubs 20 and 23 are secured in the usual manner in the forks 24 and 25 of the motor cycle frame. An axle 26 extends centrally through the hub 10 and through the hubs 20 and 23, and nuts 27 and 28 screw on the outer threaded ends of the axle 26 against washers 29 and 30 abutting against the outer ends of the hubs 20 and 23.

A spreader 35 is arranged within the hub 10 and is made of two sleeve sections 36 and 37, of which the section 36 is provided with a head 38 having recesses 39 for engagement by a wrench or other tool for turning the section 36. The latter is provided with a threaded boss 40 on which screws the threaded head 41 of the other sleeve section 37 to permit of lengthening or shortening the spreader so that the ends thereof abut against the inner faces of the bearing members 18 and 21 to hold the same properly spaced apart and likewise the sprocket wheel 14 and the brake drum 15. The sleeve sections 36 and 37 are fitted on the axle 26 and access is had to the spreader 35 by way of and opening 42 formed in the rim of the hub 10, as plainly indicated in Fig. 1. The opening 42 is normally closed by a suitable cover 43. After the sleeve sections 36 and 37 have been adjusted, they are fastened together by a set screw 44 screwing in the head 41 against the boss 40.

The inner face of the hub 12 is provided with a recessed guideway 50, and a similar guideway 51 is formed in the inner face of the hub 13 of the brake drum 15. The guideways 50 and 51 are slidingly engaged by lugs 52 and 53 formed on the inner ends of the hub 10, and the lugs 52 and 53 are provided with slotted extensions 54, 55 engaged by bolts 56, 57 held on the sprocket wheel 14 and the brake drum 15 to securely fasten the hub 10 in central position on the hubs 12 and 13 of the sprocket wheel 14 and the brake drum 15.

In order to insure proper centering of the hub 10 relative to the hubs 12 and 13, use is made of dowels 60 and 61 formed on the lugs 52 and 53 and engaging recesses 62 and 63 formed in the inner faces of the hubs 12 and 13 (see Fig. 1).

When it is desired to remove the traction wheel 11 then the operator unscrews one of the nuts 27 or 28 and pulls the axle 26 out of the hubs 10, 20 and 23. The operator next loosens the nuts 58 and 59 of the bolts 56 and 57 and slightly presses the sprocket wheel 14 and the brake drum 15 apart to disengage the dowels 60 and 61 from their recesses 62 and 63, to allow the operator to slide the lugs 52 and 53 out of the open-ended guideways 50 and 51. It is understood that the wheel 11 is pulled out from between the sprocket wheel 14 and the brake drum 15 in the direction opposite to the one in which the lugs 54, 55 extend, it being understood that on removing the wheel the spreader 35 is carried along but the sprocket wheel 14 and the brake drum 15 remain undisturbed in their usual position. When it is desired to replace the wheel 11 then the lugs 52 and 53 with their extensions 54, 55 forward are reëngaged with the guideways 50 and 51 until the centering dowels 60 and 61 snap into the recesses 62 and 63. It will be noticed that when the wheel 11 is replaced, the forked extensions 54 and 55 reëngage the bolts 56 and 57, and the nuts 58 and 59 are now screwed up to securely fasten the hub 10 in position on the sprocket wheel 14 and the brake drum 15. The axle 26 is now replaced and fastened in position by screwing up the previously removed nut 27 or 28.

From the foregoing it will be seen that the wheel 11 can be quickly removed whenever it is desired to make repairs on the tire or other part, and after such repairs have been made the wheel can be quickly returned and fastened in place.

In practice it is desirable that the hub of the front or steering wheel is made the same as the hub 10 of the rear traction wheel 11, that is, that such front wheel hub is provided with the lugs 52, 53 to permit of interchanging the rear or traction wheel with the front or steering wheel whenever it is desired to do so. Thus, for instance, if the tire of the rear traction wheel cannot properly be repaired while *en route* it may become desirable to exchange such rear traction wheel with the front steering wheel to permit the user of the motor cycle to safely reach home or a repair shop.

It is understood that when the wheel 11 is in position the sprocket wheel 14 drives the wheel 11 and the latter drives the brake drum 15. It will also be noticed that by the arrangement described a very firm connection is had between the sprocket wheel 14, the traction wheel 11 and the brake drum 15 to insure proper running of the motor cycle and to allow proper braking of the same whenever it is desired to do so.

As the brake mechanism is of usual construction it is not deemed necessary to further describe the same. It is also not deemed necessary to describe the motor cycle frame further in detail as the same is of usual construction.

Having thus described my invention, I claim as new and desire to secure by Letters Patent:—

1. In a motor cycle, a driving means, a braking means, and a propelling or traction wheel having a hub detachably secured at one end to the said driving means and detachably secured at its other end to the said braking means to allow removal of the said propelling or traction wheel without disturbing the said driving means and the said braking means.

2. In a motor cycle, a sprocket wheel, a brake drum, and a traction wheel, the hubs of the said wheels and drum having detachable connecting means connecting the wheels and drum with each other and permitting disconnecting and removing of the traction wheel from the said sprocket wheel and the said brake drum without disturbing the said sprocket wheel and the said brake drum.

3. In a motor cycle, a sprocket wheel provided at the inner face of its hub with a guideway, a brake drum provided at the inner face of its hub with a guideway, a traction wheel provided at the ends of its hub with lugs slidingly fitting into the said guideways of the sprocket wheel and brake drum, and fastening devices detachably fastening the said lugs to the said sprocket wheel and brake drum.

4. In a motor cycle, a sprocket wheel provided at the inner face of its hub with a guideway, a brake drum provided at the inner face of its hub with a guideway, a traction wheel provided at the ends of its hub with lugs slidingly fitting into the said guideways of the sprocket wheel and brake drum, the said lugs having slotted extensions, and bolts held on the said sprocket wheel and brake drum and engaging the said slotted extensions to detachably fasten the said traction wheel hub in position on the said sprocket wheel and brake drum.

5. In a motor cycle, a sprocket wheel provided at the inner face of its hub with a guideway, a brake drum provided at the inner face of its hub with a guideway, a traction wheel provided at the ends of its hub with lugs slidingly fitting into the said guideways of the sprocket wheel and brake drum, centering means for centering the said traction wheel hub relative to the said hubs of the sprocket wheel and brake drum, and fastening devices detachably fastening the said lugs to the said sprocket wheel and brake drum.

6. In a motor cycle, a sprocket wheel provided at the inner face of its hub with a guideway, a brake drum provided at the inner face of its hub with a guideway, a traction wheel provided at the ends of its hub with lugs slidingly fitting into the said guideways of the sprocket wheel and brake drum, the inner faces of the said hubs of the sprocket wheel and brake drum being provided with recesses, dowel pins on the said lugs and engaging the said recesses to hold the hub of the traction wheel centered position on the hubs of the sprocket wheel and brake drum, and fastening devices detachably fastening the said lugs to the said sprocket wheel and brake drum.

7. In a motor cycle, a sprocket wheel, a brake drum, fixed bearings on which the said sprocket wheel and brake drum are mounted to turn, a traction wheel having its hub slidingly fitting between the hubs of the said sprocket wheel and brake drum, means to detachably secure the traction wheel hub to the said sprocket wheel and brake drum, an axle extending centrally through the said bearings and the hub of the traction wheel, and a spreader held on the said axle within the hub of the traction wheel and abutting with its ends against the said bearings.

8. In a motor cycle, a sprocket wheel, a brake drum, fixed bearings on which the said sprocket wheel and brake drum are mounted to turn, a traction wheel having its hubs slidingly fitting between the hubs of the said sprocket wheel and brake drum, means to detachably secure the traction wheel hub to the said sprocket wheel and brake drum, an axle extending centrally through the said bearings and the hub of the traction wheel, and a spreader made in sleeve sections screwing one on the other, the sleeve sections engaging the rod within the said traction wheel hub, the outer ends of the sleeve sections abutting against the inner faces of the said bearings.

DANIEL LAWRENCE HICKS.